Aug. 2, 1932.  S. N. HURT  1,869,425
WEIGHING SCALE
Filed Jan. 12, 1931
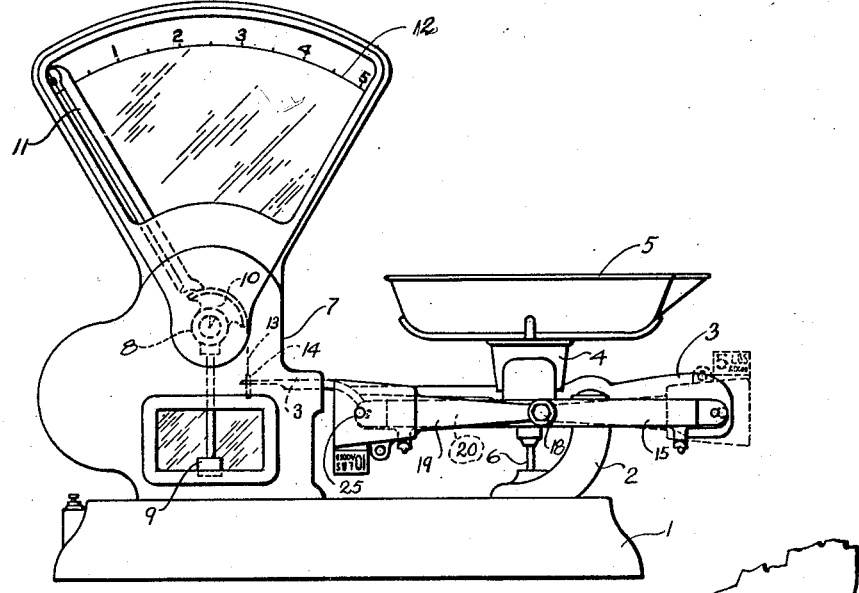
Fig-I
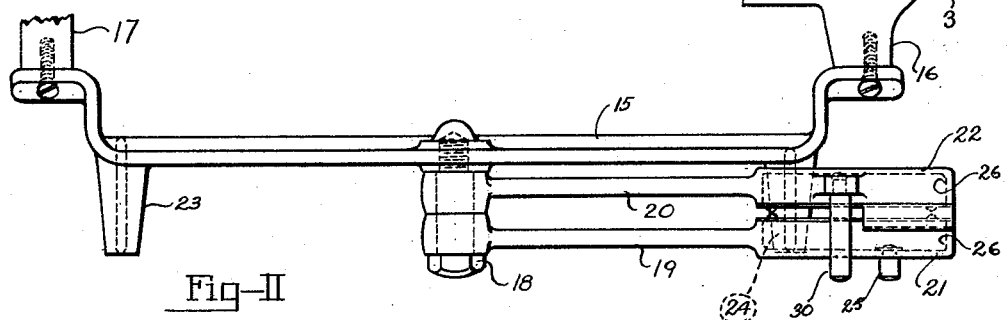
Fig-II
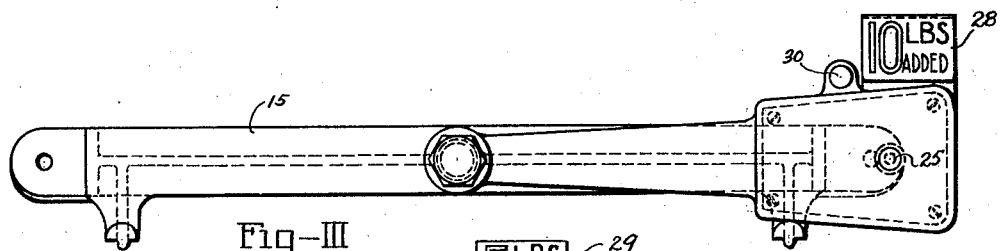
Fig-III
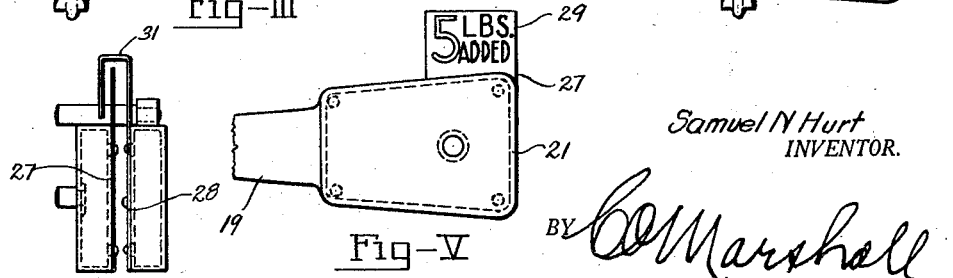
Fig-IV  Fig-V
Samuel N Hurt
INVENTOR.
BY CM Marshall
ATTORNEY.

Patented Aug. 2, 1932

1,869,425

UNITED STATES PATENT OFFICE

SAMUEL N. HURT, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed January 12, 1931. Serial No. 508,233.

This invention relates to automatic weighing scales such as are used in retail shops and particularly to scales of that type which have means for augmenting the automatic weighing capacity. It is well known in scales to increase the capacity by means of a weighted lever which is fulcrumed on the main lever of the scale and is adapted to be turned about its fulcrum from an ineffective to an effective position in which it generally offsets an amount of load equal to the chart capacity of the scale. It is usual to have the amount of load offset by this weighted lever indicated to the customer by stamping it on the weighted portion. This marking is in a position so that it is visible only on one side of the scale when it is in the effective position. It has been found that occasionally it is necessary to increase the capacity of the scale more than one hundred per cent and for this reason it is proposed to provide two such weighted levers to treble the weighing capacity of the scale. This, however, presents a new problem, namely, indicating to the customer and the merchant the total amount of the load offset by these levers; as it is necessary that this amount be added to the automatic indication on the chart. When only one of these levers is provided, this is usually accomplished as hereinbefore described; when two levers, however, are provided, errors might occur when the indications of both levers are visible.

The primary object of this invention is the provision of means for increasing the weighing capacity of a scale an amount more than the automatic capacity of the chart.

Another object of this invention is the provision of means for accomplishing this by means of weighted levers and unmistakably indicating the amount to the customer.

These and other objects and advantages will be apparent from the following description in which reference is had to the accompanying drawing and wherein similar reference numerals designate similar parts throughout the several views.

Referring to the drawing:—

Figure I is a front elevational view of a scale embodying the invention.

Figure II is an enlarged plan view of the manipulative counterbalancing means.

Figure III is an enlarged side elevational view of the above referred to mechanism.

Figure IV is an enlarged end elevational view illustrating in detail the co-operation of the indicating members.

Figure V is a fragmentary enlarged detail of the counterbalanced weight of the lever.

Referring to the drawing in detail, the scale per se to which I have shown an embodiment of my invention attached, is well known and I will describe it only in so far as is necessary to fully disclose my invention. The scale comprises a rigid base 1 preferably an iron casting on which, adjacent one end, a base horn 2 is mounted. A lever 3 equipped with fulcrum load and power pivots is mounted upon suitable bearings (not shown) stationed in the upper ends of the bifurcations of the base horn 2. A load supporting spider 4 having similar suitable bearings rests upon the load pivots of the lever and is provided with means to support and hold a commodity receiver 5. Suitable check link mechanism, including a depending spider stem 6, is provided to maintain the condition of level of the load receiver. The nose portion of the lever extends into a hollow housing 7 which is stationed on the opposite end of the base and pivotally supports a load counterbalancing pendulum 8 comprising a pendulum weight 9, a rectifying cam segment 10, and an indicator 11. The indicator co-operates with a stationary graduated chart 12 which is fastened in the upper part of the housing 7. A flexible metallic ribbon 13 is secured to the upper end of the rectifying segment 10 and overlies its arcuate surface and has a stirrup 14 secured to its lower end. This stirrup engages the nose pivot of the lever 3. When a load is placed on the load receiver 5, the force exerted by it is transmitted through the lever 3 and the flexible member 13 to the counterbalancing pendulum which will move outwardly and upwardly a distance proportional to the load. This angular motion is always in proportion to the load and therefore the distance traversed by the indicator is an indication of the weight of the load.

To augment the weighing capacity of the automatic scale thus far described, a bracket 15 is fastened to laterally extending arms 16 and 17 of the lever 3 into which a fulcrum bolt 18 is threaded on which levers 19 and 20 are turnably mounted. These levers are equipped with weights 21 and 22 respectively and are adapted to rest on two outwardly extending projections 23 and 24. These projections are so located that when the weights are shifted from the ineffective to the effective position or vice versa, the static balance of the lever 3 is not changed. To prevent foreign material such as sugar, coffee, from lodging thereon, which might prevent the weight from returning to its original position, the upper surfaces of these projections are rounded.

In Figure I the levers 19 and 20 are shown in the ineffective position, that is when in this position, they form balanced portions of the lever and therefore do not counterbalance any part of a load in the load receiver. When it is desired to weigh a load which is greater than the automatic chart capacity (in this example 5 lbs.) the operator by grasping the handle 25 fastened to the weight 21 of the lever 19 can move this weight into the effective position as shown by the dotted lines in Figure I. This disturbs the balance of the lever 3 so that an amount equal to the chart capacity is offset thereby. The weights 21 and 22 in this embodiment are metallic castings integral with the levers and have a hollow space 26 cast therein which is adapted to be filled with lead to the required weight. These hollow spaces are covered by plates 27 and 28 respectively. The plate 27 covering the opening 26 has an upwardly extending portion 29 on which indicia are marked denoting the amount of load offset by this weight. These indicia are marked on both sides of this projection portion and therefore are visible to both the merchant and the customer. When the load to be weighed is greater than the combined counterbalancing capacity of the automatic weighing mechanism and the weighted lever 19 acting together, in this example 10 lbs.; the operator may increase the total weighing capacity still further by similarly turning the weighted lever 20 about its fulcrum by grasping by the handle 30. This still further disturbs the balance of the lever and increases the weighing capacity to the extent of another increment equal to the chart capacity (in this example 5 lbs.). The plate 28 which covers the opening 26 in the weight 22 has a substantially U shaped projection 31. When this lever is in the effective position the U shaped flash indicator envelopes the indicator fastened to the lever 19 and displays indicia, denoting the combined offsetting effect of both levers 19 and 20, which are marked on both legs of the U.

The handle 30 of the lever 20, in the ineffective position, extends underneath the lever 19 and it is therefore impossible to turn it into the effective position unless the lever 19 is also turned. The lever 19 of course can be placed in the effective position independently of the lever 20. It will be readily seen from the aforegoing that it is impossible to offset any portion of the load without indicating this to both the merchant and the customer, thus obviating mistakes and the resulting losses.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, automatic weighing and indicating mechanism, two manipulative load offsetting means in co-operative relation therewith, said manipulative load offsetting means comprising weighted levers fulcrumed on a member of the automatic weighing mechanism, each of said weighted levers having indicating means and adapted to be shifted from an ineffective to an effective position in predetermined sequence.

2. In a weighing scale, in combination, automatic weighing and indicating mechanism, manipulative load offsetting means in co-operative relation therewith, said manipulative means comprising a plurality of levers adapted to be moved from an ineffective to an effective position, means for indicating the amount of load offset, attached to each of said levers, said levers being adapted to be moved in predetermined sequence and each successively moved lever indicating the sum of the amounts of the load offset thereby.

3. In a weighing scale, in combination, automatic weighing and indicating mechanism, manipulative load offsetting means in co-operative relation therewith, said manipulative load offsetting means comprising a pair of weighted levers pivotally secured to the automatic weighing mechanism and adapted to be turned about their pivots from an ineffective to an effective position in succession, one of said levers having an indicator to indicate the amount of load offset thereby, the other of said levers having means for indicating the sum of the amounts of the loads offset by said levers acting together and adapted to conceal the indication of the first said lever when co-operating therewith.

4. In a weighing scale, in combination, with an automatically operating load offsetting pendulum, a load supporting lever, a plurality of supplementary load counterbalancing weights pivoted on said lever and adapted to be rotated from an ineffective to an effective position, one of said levers having a relatively thin indicia bearing plate secured thereto, the other said lever having a substantially U shaped member bearing indicia on both legs of the U and adapted to envelop the relatively thin indicia bearing plate of the first said lever, when both levers are in the effective position.

SAMUEL N. HURT.